Figure 1:
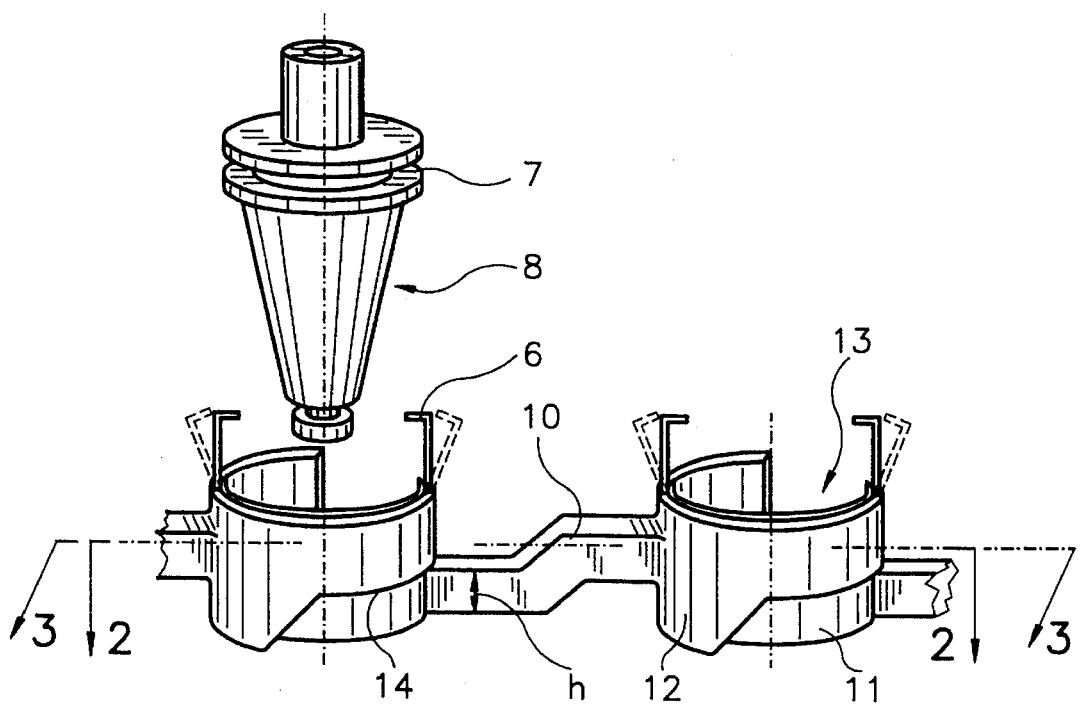

United States Patent [19]
Klicpera

[11] Patent Number: 5,476,436
[45] Date of Patent: Dec. 19, 1995

[54] CHAIN MAGAZINE FOR HOLDING MACHINING TOOLS

[75] Inventor: Udo Klicpera, Pfronten, Germany

[73] Assignee: Kopp Werkzeugmaschinen GmbH, Neu-Ulm, Germany

[21] Appl. No.: 313,207
[22] PCT Filed: Mar. 23, 1993
[86] PCT No.: PCT/DE93/00261
  § 371 Date: Sep. 27, 1994
  § 102(e) Date: Sep. 27, 1994
[87] PCT Pub. No.: WO93/19893
  PCT Pub. Date: Oct. 14, 1993

[30] Foreign Application Priority Data

Mar. 27, 1992 [DE] Germany ............... 9204131 U

[51] Int. Cl.⁶ .................................................. B23Q 3/157
[52] U.S. Cl. .................................... 483/68; 211/1.56
[58] Field of Search .................... 483/68, 61, 59, 483/58, 66; 211/1.51, 1.52, 1.53, 1.55, 1.56

[56] References Cited

U.S. PATENT DOCUMENTS

| | | | |
|---|---|---|---|
| 3,541,677 | 11/1970 | Fiegler | 483/68 X |
| 3,591,920 | 7/1971 | Branard et al. | 483/68 X |
| 4,182,021 | 1/1980 | Kato et al. | 483/59 |

FOREIGN PATENT DOCUMENTS

| | | | |
|---|---|---|---|
| 2000779 | 8/1971 | Germany . | |
| 2525212 | 12/1976 | Germany . | |
| 3431091 | 10/1989 | Germany . | |
| 201146 | 12/1982 | Japan | 483/68 |
| 181536 | 10/1983 | Japan | 483/68 |
| 71938 | 4/1986 | Japan | 483/68 |
| 670698 | 6/1989 | Switzerland . | |
| 990469 | 1/1983 | U.S.S.R. . | |
| 2207738 | 2/1989 | United Kingdom . | |

*Primary Examiner*—William Briggs
*Attorney, Agent, or Firm*—Horst M. Kasper

[57] ABSTRACT

The invention concerns a chain magazine designed to hold the machining tools for machining devices, in particular tooling machines. The magazine comprises a continuous chain fitted with holder devices for the machining tools and driven by at least two sprockets and guided by guide elements up to the point of contact with the pitch diameter of the drive or guide sprocket wheel. The chain magazine further comprises chain links consisting of a connecting bar and, joined to the bar, two tubular sleeve elements of different diameter which form the flexible couplings between the links. Holder devices for machining tools are disposed coaxially to the hinge axes in the mutually encircling tubular sleeves under a small motion clearance. Shaft-like cutouts are furnished in each of the tubular sleeves and exhibiting parallel faces disposed spaced apart and directed toward the center axes of the holder devices. Said cutouts form an open insertion channel or, respectively, removal channel in the respective insertion position or, respectively, removal position of the chain hinge. The respective (outer) tubular sleeve, which surrounds the (inner) tubular sleeve of a smaller diameter, exhibits in a sector of its circumference a recess of the thickness of the connecting bar.

20 Claims, 4 Drawing Sheets

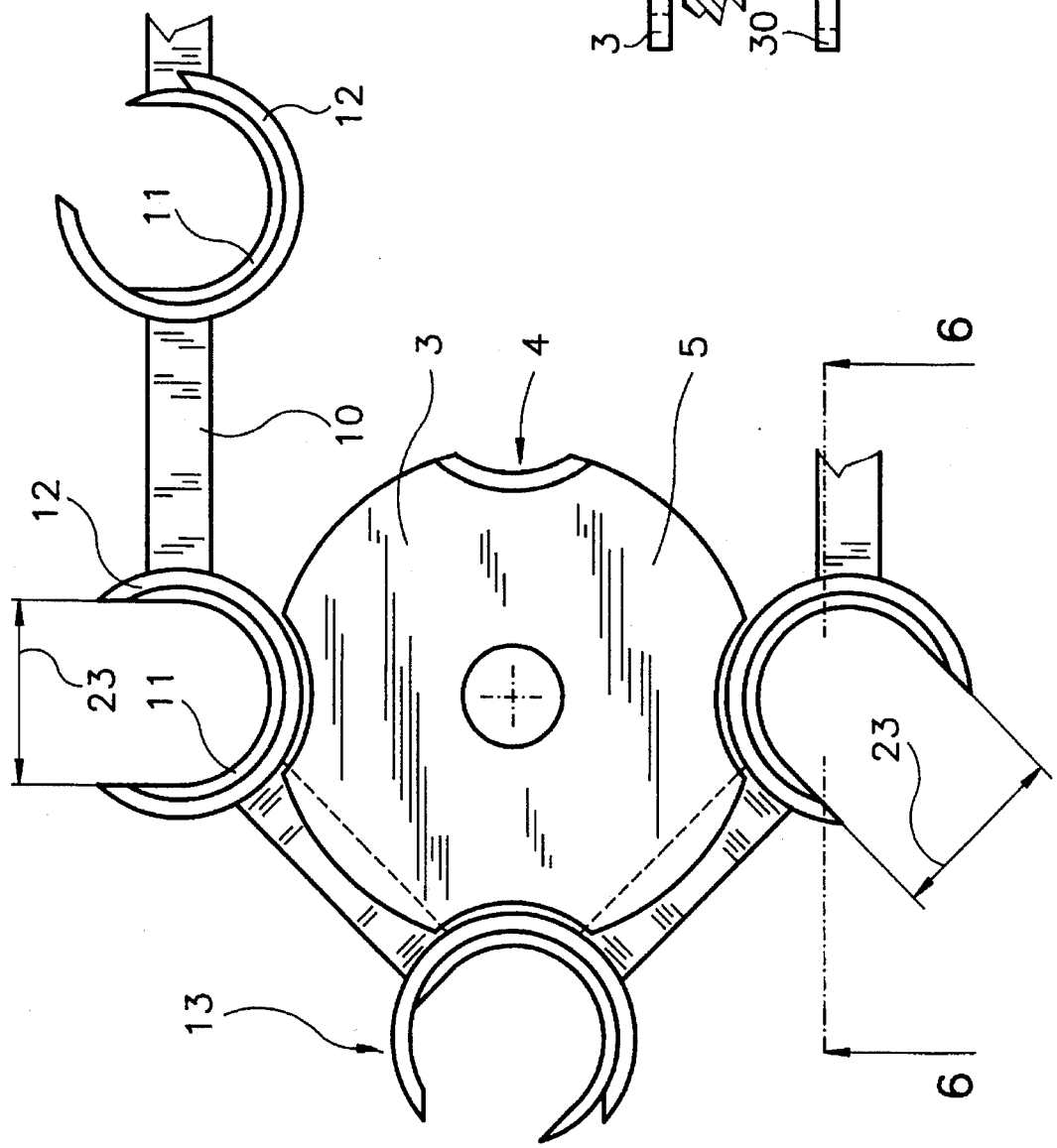

CHAIN MAGAZINE FOR HOLDING MACHINING TOOLS

The invention relates to a chain magazine for receiving of machining tools for machining devices, in particular, tooling machines. Chain magazines of this kind comprise essentially a continuous chain with tool holders and at least two sprocket wheels as well as guide elements for the chain links following to the reference circle diameter of the guide sprocket wheel.

Such chain magazines are known, for example, from the German Printed Patent Document DE-OS 2,000,779. The hinges connecting the chain links are formed of hollow cylindrical shape in the chain magazine shown in the German Printed Patent Document DE-OS 2,000,779 and the hinges are formed as tool holders. This is associated with the consequence that the tools can only be inserted or, respectively, withdrawn in the direction of the hinge axes of the hollow cylinders connecting the chain links.

The last recited disadvantage is avoided in a chain magazine known from the German Printed Patent Document DE-OS 2,525,212 A1. The tool holders are disposed at chain link plates according to the German Printed Patent Document DE-OS 2,525,212 A1, which chain link plates are hingedly connected to each other by receiving free chain link plates. The center link plates of the tool holders therefore describe path curves, where the path curves exhibit a substantial distance from the path curves of the link pins. Because of the free intermediate chain link plates, the receiving capacity is limited to half of the chain links present. In particular, it is a disadvantage in this context that high torques occur, in particular, upon a start-up and braking because of the distance of the path of motion of the tools from the curve of the path of the chain proper, which situation should be avoided.

The German Printed Patent Document DE 3,431,091 C2 shows a magazine of this kind, where each chain link plate is furnished centered between the link pins with a tool holder. While according to this, the path of motion of the axes of the tool holders is placed closer to the path curve of the chain, there remains nevertheless still a disadvantageous distance causing torques associated with the individual motion of the tools.

Therefore, the object is to provide such a chain magazine for machining devices, where the axes of the tool holders run precisely in the curve of the path of the chain, and which allows the discharge of the tools in a direction perpendicular to the axes of the tools or, respectively, of the tool holders.

The solution according to the invention is associated with the following features starting with a chain magazine of the recited kind:

a) chain links are formed by a connecting bar and two tubular sleeves of different diameters connected at two ends of the connecting bar to the connecting bar and forming the chain hinges, b) holder devices for machining tools are disposed coaxially to the hinge axes (Z) in the mutually encircling tubular sleeves under a small motion clearance, as well as c) shaft-like cutouts are furnished in each of the tubular sleeves and exhibit parallel faces disposed spaced apart and directed toward the center axes of the holder devices, wherein the tubular sleeves form an open insertion channel or, respectively, removal channel in the respective insertion position or, respectively, removal position of the chain hinge.

The idea on which the invention is based starts with the consideration that large acceleration forces acting on the chain links and on the tools inserted in the holder devices are to be avoided. These forces and torques occur in particular based on jumps in acceleration upon the transition from a straight into a curved path section of the chain transport and vice versa, and these forces and torques increase with a square dependence in case of an increased transport speed. Therefore, it is advantageous if the axis of the tool coincides with the axis of the chain hinge. If the hinge axis of the chain does not coincide with the path of motion of the tools, then very high acceleration forces and torques occur, in particular in case of high transport speeds and very high acceleration forces and torques cause premature wear of the chain or of the holder device.

It is furthermore advantageous that the tool and chain hinge axes coincide because a dense loading of the chain can be realized with the tools disposed at a small distance, and where nevertheless a chain can be realized with extremely small curve radii. In a chain magazine, according to the German Patent DE 3,431,091 C2 there occur increased acceleration forces and torques based on the connecting bars having a course which is secant-shaped and inwardly directed in the curved part sections, for example in the region of the sprocket wheels, on the one hand, because of the deviation of the path of motion of the axes of the tools from the path of motion of the chain links and, on the other hand, the smallest possible curve radius is limited based on the necessary spaces between the tools. The separation distance of the chain links is determined in case of the chain magazine of the present invention by the largest tool diameter. The guide sprocket wheels can be reduced to be made up of only two sprockets. Transport speeds of up to 100 m/min or beyond are possible without that the acceleration forces and the centrifugal forces and the torques become too large. This makes very short tool change times possible.

The insertion position or, respectively, the removal position of the chain hinge can be adapted to the requirements of the machine. Depending at which position of the adjoining chain links the cutouts in the tubular sleeves are brought to overlap and thereby form the insertion channel or, respectively, the removal channel, the removal of the tool is possible on a straight or angular path region of the course of the chain.

An essential feature of the invention comprises that the respective (outer) tubular sleeve engaging into the space width between the sprockets of the sprocket wheel, which tubular sleeve encircles the (inner) tubular sleeve of a smaller diameter, exhibits along a sector of its circumference a recess of the thickness of the connecting bar.

The recess allows the mutual hinged rotatability of chain links adjoining to each other in the case of a simultaneously coaxially extending course of the connecting bar.

A further embodiment feature can comprise that the sprocket wheels are formed of two sprocket wheel disks disposed at a distance to each other. The two bilaterally free (outer) tubular sleeves of larger diameter engage into the two sprocket wheel disks. The connecting bars of the chain run between the two sprocket wheel disks. This is associated with the advantage of an improved chain guide accepting torques and providing an increased directional stability.

Advantageously, the tubular sleeves, forming the hinges and engaging into the space widths between the sprockets of the sprocket wheel, are connected to form a single piece with the connecting bar. This construction allows a low-cost assembly of the chain.

It can further be provided that the tubular sleeves forming the hinges and engaging into the space widths between the sprockets of the sprocket wheel, are connected to each other by a connecting bar comprising two spaced-apart chain link plates such that the two connecting bars of the chain link surround the sprocket wheel on two sides.

According to a further advantageous feature, it is proposed that the connecting bars are furnished with guiding rollers. The guiding rollers serve in a conventional way for the direction-stabilized guiding of the chain along guide rails.

The chain magazine is also furnished in a conventional way with clamping members for the disengageable support of the tool shaft or of the tool cone in the holder devices for the machining tools.

Appropriately, it can be advantageous for decreasing the wear of the hinges, if in each case the outer (larger) tubular sleeve, surrounding the inner tubular sleeve of a smaller diameter, is furnished with track rollers received by the space widths between the sprockets of the sprocket wheels.

The advantages of a chain magazine according to the invention as compared to the state of the art comprise the possibility of insertion and removal of the tools in a direction perpendicular to the axes of the tools at an arbitrary position of a straight or curved part section of the course of the chain and, in particular, also the possibility of loading the chain densely with tools in case of simultaneously short chain links and narrow courses of curves, as well as the possibility of running very high transport speeds for achieving the shortest tool change times while avoiding undesirably high acceleration forces and centrifugal forces and torques.

Figure 2:
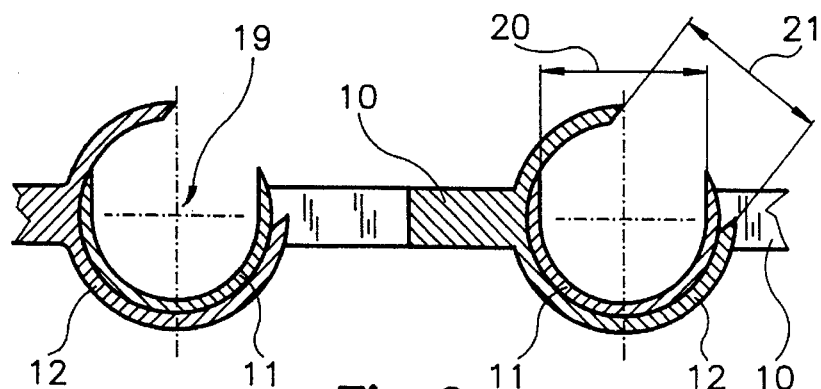
Figure 3:
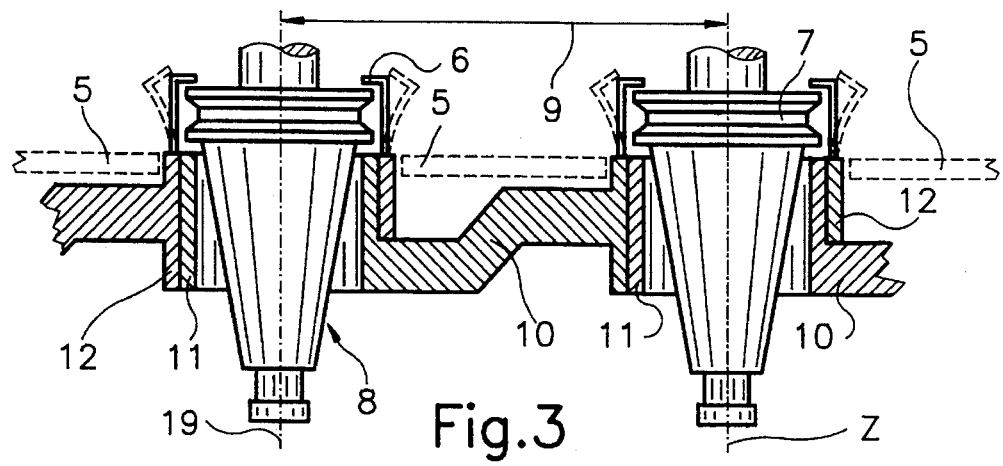
Figure 4:
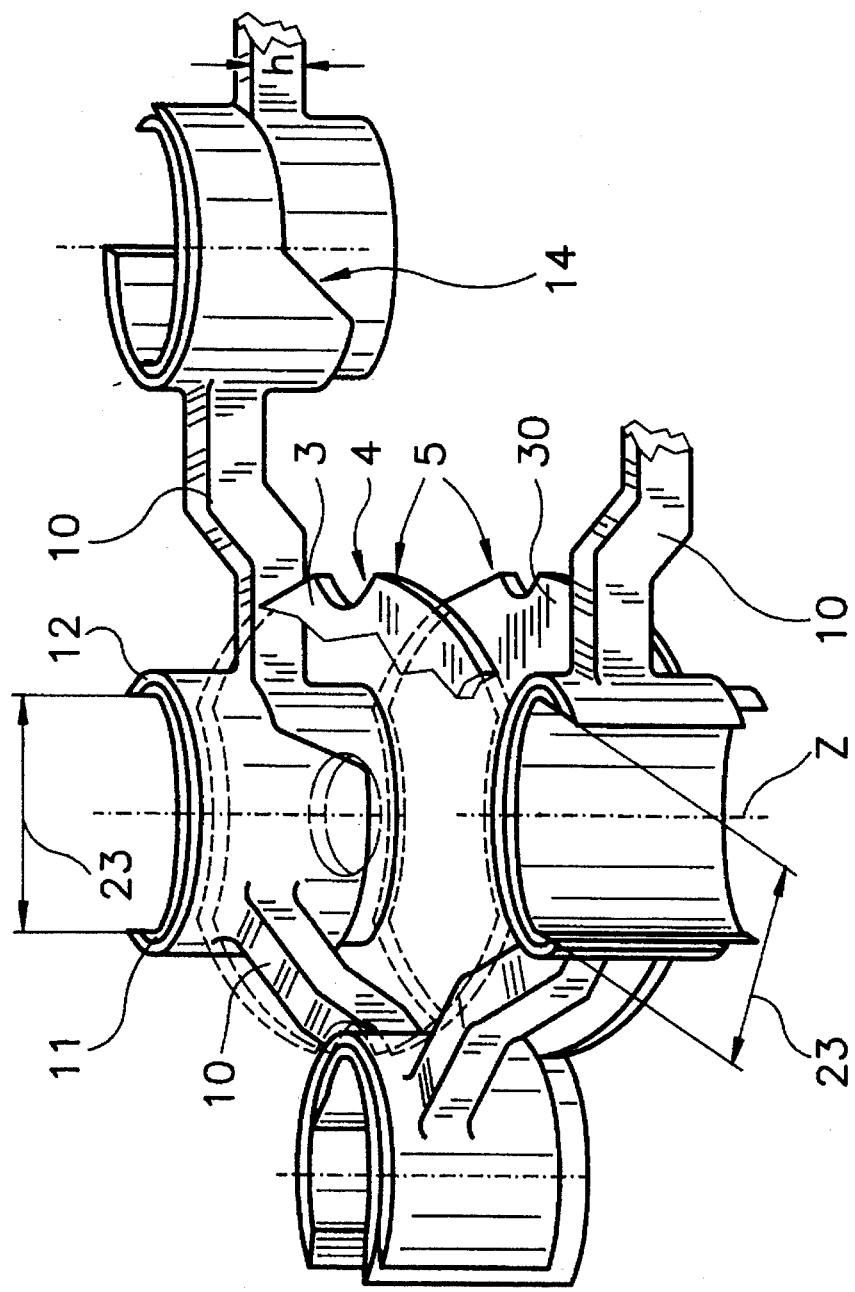
Figure 10:
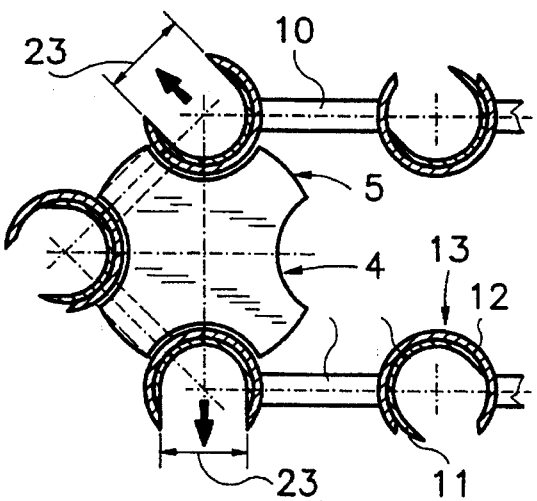
Figure 7:
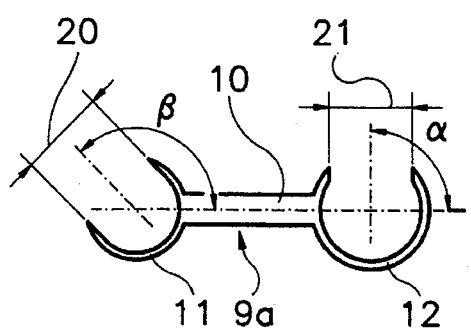
Figure 9:
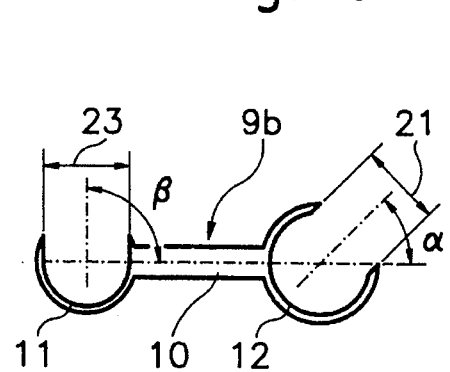
Figure 12:
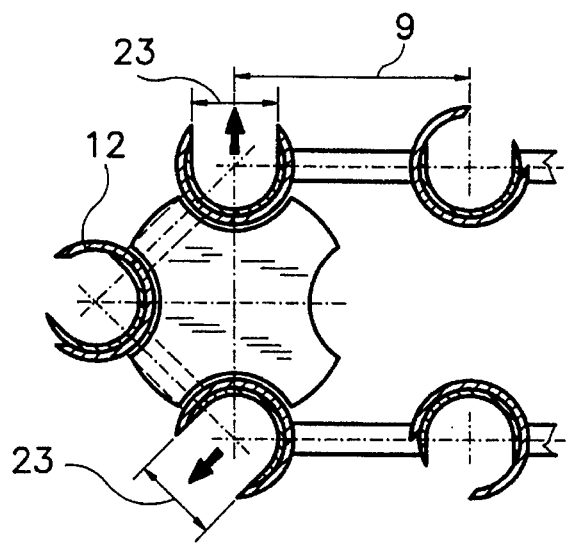
Figure 11:
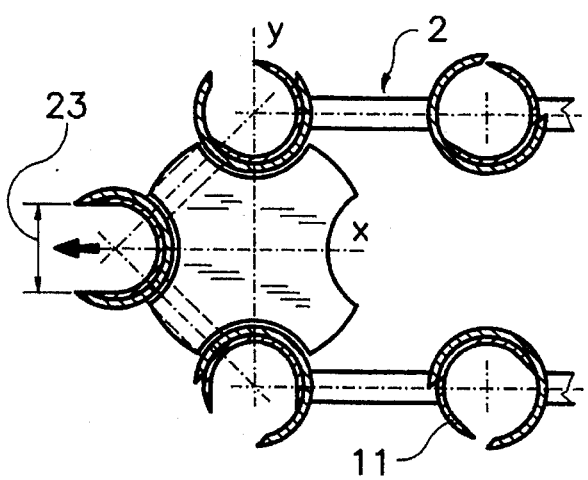
Figure 8:
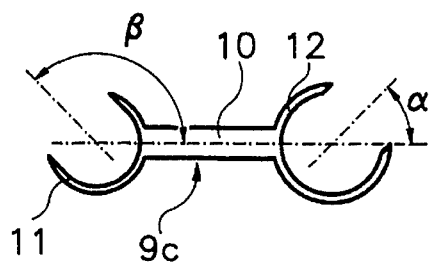

The following embodiments of the invention allow to recognize further advantageous features and characteristics, where the advantageous features and characteristics are described in more detail and explained by way of the schematic representations in the drawings in the following. There is shown in FIG. 1 a perspective view of a chain link with the respective bilaterally hinged chain links shown as a part representation;

FIG. 2 a section A-B through the chain link illustrated in FIG. 1;

FIG. 3 a section C-D through the chain link illustrated in FIG. 1;

FIG. 4 a perspective view of the part of the chain magazine, which is guided around a four-sprocket two-disk sprocket wheel;

FIG. 5 a schematic side view of the view according to FIG. 4;

FIG. 6 a schematic section E-F through the view according to FIG. 5;

FIG. 7 a chain link according to a first embodiment;

FIG. 8 a chain link according to a second embodiment;

FIG. 9 a chain link according to a third embodiment;

FIG. 10 a side view according to FIG. 6 with two removal directions;

FIG. 11 a side view according to FIG. 6 with one removal direction;

FIG. 12 a side view according to FIG. 6 with two removal directions;

As can be recognized from FIG. 1, the hinges 13 are in each case formed by two chain links 9, coupled to each other, where a chain link 9 in each case is formed by two tubular sleeves 11, 12, guiding each other mutually and sliding in each other, where the tubular sleeves are connected to each other with the connecting bar 10. This connection can be made of one piece as illustrated, however, also out of several pieces, for example by two chain link plates leaving an intermediate free space. As can be recognized further from FIG. 1, the connecting bar 10 is cranked in order to be able to hold the axial extension of the tubular sleeves 11, 12 shorter and in order to create nevertheless space for the engagement of the sprockets 5 of the sprocket wheel as illustrated in FIG. 3.

Furthermore, the tool 8 to be inserted is recognized in FIG. 1 together with a gripper groove 7, where the clamping members 6 engage into the gripper groove 7 (compare FIG. 3).

A recess of the thickness h of the connecting bar 10 is placed in the sector 14 of the outer tubular sleeve 12 surrounding the inner tubular sleeve 11 of a smaller diameter. This recess allows a deflection of the connecting bar 10 of the following chain link 9; this deflection amounts for example to 45° in case of the four-sprocket sprocket wheel 3 illustrated in FIG. 6; in case of a sprocket wheel with six sprockets, this deflection would be 30°.

The section A-B according to FIG. 2 shows in axial view (tool axis z) or, respectively, coordinate axes 19, the tubular sleeves 11, 12 engaging each other, where the tubular sleeves 11, 12 are connected by way of the connecting bar 10. Furthermore, the cutouts 20 of the tubular sleeve 11 and cutouts 21 of the tubular sleeve 12, formed by parallel faces, are recognizable, which cutouts 20, 21 form in case of a corresponding alignment—compare FIG. 4 and 5—the insertion channel or, respectively, the removal channel 23 for the tool 8.

The chain link 9 is shown in FIG. 3 in a sectional view C-D; the illustrated elements are furnished with the already recited reference numerals, and it is indicated by dashed lines in which region the sprockets 5 of a single-disk-shaped sprocket wheel encircle in part the tubular sleeves 12.

It can be recognized from the illustration in FIG. 4 how four chain links 9 are engaged by an intermediate sprocket wheel comprising the disks 3 and 30, where the sprockets of the intermediate sprocket wheel are designated with 5, and where the spaces between the sprockets of the intermediate sprocket wheel are designated with 4. It can be recognized that insertion positions and removal positions 23 (Zu/En) for tools can be obtained in two positions, if—compare FIG. 12—the cutouts 20, 21 are disposed as illustrated for example in FIG. 9.

The view of FIG. 5 shows the embodiment according to FIG. 4 in a side view. In case of an example with a four-sprocket sprocket wheel, it is more clearly recognizable, that in a first insertion position or, respectively, a removal position (Zu/En), a removal channel 23 is disposed at an angle of 90° relative to the straight advance direction of the chain, and in a second insertion position or, respectively, removal position (Zu/En) at an angle of 135° relative to the straight advance direction of the chain 2, and in fact in dependence on the selected angle positions α and β of the cutouts 20, 21 in the tubular sleeves 11, 12.

The section E-F according to FIG. 5, illustrated in FIG. 6, allows to recognize in the example according to FIG. 4 that the disks 30 and 3 of the sprocket wheel engage with their sprockets 5 or, respectively, their spaces 4 between the sprockets 5 bilaterally into the tubular sleeves 1, 12 of the chain links 9.

The representations 7–12 show three configurations of chain links 9 for a chain magazine according to the invention with four-sprocket sprocket wheels according to the embodiments of FIGS. 1–6. These configurations are characterized by a very small space requirement, and this configuration allows a precise guiding of the tools in the magazine.

The configuration of the chain link 9a as shown in FIG. 7 allows the two, insertion and removal, positions in the y-axis and at 45° relative to the y-axis (respectively 135° relative to the straight advance direction of the chain 2), which two insertion and removal positions are illustrated in FIG. 10. in correspondence to the FIGS. 4 and 5. Here the angle α for the cutout 21 in the tubular sleeve 12 amounts to 90° and the angle β for the cutout 20 in the tubular sleeve 11 amounts to 135°.

The angle α of the cutout 21 amounts to 45°, and the angle β of the cutout 20 amounts to 90° according to the configuration shown in FIG. 9b; with this embodiment, the insertion position and the removal position (Zu/En) in the y-axis and at 45° to the y-axis can be achieved as illustrated in FIG. 12; these positions are inverted relative to the positions according to FIG. 10.

Only one insertion position or, respectively, removal position can be achieved with the cutouts 20, 21 inclined by 45° at the angle α in the tubular sleeve 12 and inclined by 135° for the angle β in the tubular sleeve 11 as illustrated in FIG. 9c, i.e. in the x-axis as can be recognized from FIG. 11.

Five positions for the removal of tools can be achieved with the three illustrated configurations of the cutouts 20, 21 according to FIGS. 7 through 9. If intermediate positions are also to be made possible, then the cutouts 20, 21 have to receive correspondingly deviating angle positions α and β.

I claim:

1. A chain magazine for receiving of machining tools for machining devices, in particular tooling machines, comprising a continuous chain furnished with holder devices for machining tools and driven by at least two sprocket wheels, wherein the continuous chain is guided by way of guide elements up to reference circle diameters of the sprocket wheels;

chain links (9) comprising a connecting bar (10) and two tubular sleeves (11, 12) of different diameters connected at two ends of the connecting bar (10) to the connecting bar (10) and forming chain hinges (13), and wherein the holder devices for machining tools (8) are disposed coaxially to hinge axes (Z) in the mutually encircling tubular sleeves (11, 12) under a small motion clearance;

shaft-like cutouts (21, 22) furnished in each of the tubular sleeves (11, 12) and exhibiting parallel faces disposed spaced apart and directed toward center axes (19) of the holder devices, which cutouts (21, 22) form a channel (23) corresponding to the respective position of the chain hinge (13).

2. The magazine according to claim 1, wherein one respective (outer) tubular sleeve (12), which surrounds one (inner) tubular sleeve (11) of a smaller diameter, exhibits in a sector (14) of its circumference a recess of a thickness (h) of the connecting bar (10).

3. The magazine according to claim 1, further comprising spaces (4) between sprockets of the sprocket wheel (3) forming bearings for the hinge-forming (outer) tubular sleeves (12) of larger diameter.

4. The magazine according to claim 1, wherein the sprocket wheels (3) comprise two spaced-apart sprocket wheel disks (3, 30), wherein the bilaterally disposed free (outer) tubular sleeves (12) of larger diameter engage into the sprocket wheel disks (3, 30), and wherein the connecting bars (10) of the chain (2) run between the spaced apart sprocket wheel disks.

5. The magazine according to claim 1, wherein the hinge-forming tubular sleeves (11, 12), engaging into spaces (4) between sprockets (5) of the sprocket wheel, are connected as a single piece with the connecting bar (10).

6. The magazine according to claim 1, wherein the hinge-forming tubular sleeves (12), engaging into spaces (4) between sprockets (5) of the sprocket wheel, are connected to each other by way of a connecting bar comprising two spaced-apart chain link plates.

7. The magazine according to claim 6, wherein the two chain link plates of the connecting bar of the chain links (9) surround the single-disk sprocket wheel (3) on two sides of the sprocket wheel.

8. The magazine according to claim 1, wherein the connecting bars (10) are furnished with guiding rollers.

9. The magazine according to claim 2, wherein the respective outer (larger) tubular sleeve (12), surrounding the inner tubular sleeve (11) of smaller diameter, is furnished with track rollers received by spaces (4) between the sprockets (5) of the sprocket wheels (3).

10. The magazine according to claim 1, wherein the holder devices for the machining tools are furnished with clamping members (6) for a disengageable support of the machining tools (8).

11. A chain magazine for receiving of machining tools for machining devices, comprising a chain link comprising a connecting bar, a first tubular sleeve, and a second tubular sleeve, wherein the diameter of the first tubular sleeve is larger than the diameter of the second tubular sleeve, wherein the first tubular sleeve is connected to a first end of the connecting bar and wherein the second tubular sleeve is connected to a second end of the connecting bar wherein the first tubular sleeve is to form with and to encircle another second tubular sleeve a first chain hinge and wherein the second tubular sleeve is to form with and to be encircled by another first tubular sleeve a second chain hinge and wherein the first chain hinge and the second chain hinge are furnished with respective hinge axes;

a holder device for a machining tool disposed coaxially to the hinge axis of one of the chain hinges under a small motion clearance between the holder device and the second tubular sleeve;

a first shaft-like cutout furnished in the first tubular sleeve and exhibiting parallel faces disposed spaced apart and directed parallel relative to the center axis of the holder device;

a second shaft-like cutout furnished in the second tubular sleeve and exhibiting parallel faces disposed spaced apart and directed parallel relative to the center axis of the holder device, wherein the first cutout and the second cutout form respective open insertion channels or, respectively, removal channels for the holder device in a respective insertion position or, respectively, removal position of the chain hinge.

12. The chain magazine according to claim 11 further comprising a second chain link comprising a second connecting bar, a third tubular sleeve, and a fourth tubular sleeve with the first chain link and the second chain link forming a continuous chain, which is furnished with holder devices for machining tools;

a first sprocket wheel for driving the continuous chain; a second sprocket wheel engaging the continuous chain such that the continuous chain is guided by way of guide elements up to the reference circle diameters of the first sprocket wheel and of the second sprocket wheel such that the chain magazine is adapted to tooling machines.

13. The chain magazine according to claim 12 further comprising a bearing for the first tubular sleeve formed by an intermediate space disposed between sprockets of the first sprocket wheel.

14. The chain magazine according to claim 12 wherein the first sprocket wheel comprises two spaced-apart sprocket wheel disks, wherein the first tubular sleeve engages into the sprocket wheel disks, and wherein the connecting bar of the chain runs between the two spaced-apart sprocket wheel disks.

15. The chain magazine according to claim 12 wherein the first tubular sleeve engages into the space between the two neighboring sprockets of the sprocket wheel, and wherein the first tubular sleeve and the second tubular sleeve are connected with the connecting bar formed as a single piece.

16. The chain magazine according to claim 12 wherein the first tubular sleeve engages into the space between the two neighboring sprockets of the sprocket wheel, and wherein the first tubular sleeve and the second tubular sleeve are connected with the connecting bar formed as two spaced-apart chain link plates and wherein the two chain link plates of the connecting bar of the chain link surround the single-disk sprocket wheel on two sides.

17. The chain magazine according to claim 12 further comprising guiding rollers attached to the connecting bar;

track rollers attached to the first tubular wheel and received by the space between two neighboring sprockets of the first sprocket wheel.

18. The chain magazine according to claim 11 further comprising a narrowed sector representing a recess of a thickness (h) of the connecting bar and disposed in a circumference of the first tubular sleeve, which surrounds a fourth tubular sleeve of a smaller diameter.

19. The chain magazine according to claim 11 further comprising clamping members attached to the holder devices for the machining tools for allowing a disengageable support of the machining tools.

20. The chain magazine according to claim 1, wherein the sprocket wheels are guide drive sprocket wheels and wherein the channel (23) is an insertion channel in an insertion position of the chain hinge (13).

\* \* \* \* \*